United States Patent [19]

Wheatley et al.

[11] Patent Number: 4,858,441
[45] Date of Patent: Aug. 22, 1989

[54] HEAT-DRIVEN ACOUSTIC COOLING ENGINE HAVING NO MOVING PARTS

[75] Inventors: John C. Wheatley, Los Alamos; Gregory W. Swift; Albert Migliori, both of Santa Fe; Thomas J. Hofler, Los Alamos, all of N. Mex.

[73] Assignee: The United States of America as represented by the United States Department of Energy, Washington, D.C.

[21] Appl. No.: 147,126

[22] Filed: Jan. 21, 1988

Related U.S. Application Data

[63] Continuation of Ser. No. 942,139, Mar. 2, 1987, abandoned, which is a continuation of Ser. No. 829,345, Feb. 13, 1986, abandoned.

[51] Int. Cl.[4] .............................. F25B 9/00; F03G 7/00
[52] U.S. Cl. ............................................ 62/6; 62/467; 60/517; 60/721
[58] Field of Search ............... 62/6, 467, 118; 60/516, 60/721, 650, 682, 517; 165/4, 9, 10

[56] References Cited

U.S. PATENT DOCUMENTS

| | | | |
|---|---|---|---|
| 2,836,033 | 5/1958 | Morrison | 60/516 |
| 3,237,421 | 3/1966 | Gifford | 62/6 |
| 4,114,380 | 9/1978 | Ceperley | 62/467 X |
| 4,355,517 | 10/1982 | Ceperley | 60/721 |
| 4,398,398 | 8/1983 | Wheatley et al. | 62/6 X |
| 4,489,553 | 12/1984 | Wheatley et al. | 62/6 X |
| 4,599,551 | 7/1986 | Wheatley et al. | 322/2 R |

OTHER PUBLICATIONS

John Wheatley et al., "Natural Engines", Physics Today (Aug. 1985).

Primary Examiner—Harry B. Tanner
Attorney, Agent, or Firm—Ray G. Wilson; Paul D. Gaetjens; Judson R. Hightower

[57] ABSTRACT

A heat-driven acoustic cooling engine having no moving parts receives heat from a heat source. The acoustic cooling engine comprises an elongated resonant pressure vessel having first and second ends. A compressible fluid having a substantial thermal expansion coefficient and capable of supporting an acoustic standing wave is contained in the resonant pressure vessel. The heat source supplies heat to the first end of the vessel. A first heat exchanger in the vessel is spaced-apart from the first end and receives heat from the first end. A first thermodynamic element is adjacent to the first heat exchanger and converts some of the heat transmitted by the first heat exchanger into acoustic power. A second thermodynamic element has a first end located spaced-apart from the first thermodynamic element and a second end farther away from the first thermodynamic element than is its first end. The first end of the second thermodynamic element heats while its second end cools as a consequence of the acoustic power. A second heat exchanger is adjacent to and between the first and second thermodynamic elements. A heat sink outside of the vessel is thermally coupled to and receives heat from the second heat exchanger. The resonant pressure vessel can include a housing less than one-fourth wavelength in length coupled to a reservoir. The housing can include a reduced diameter portion communicating with the reservoir.

24 Claims, 6 Drawing Sheets

HEAT-DRIVEN ACOUSTIC COOLING ENGINE HAVING NO MOVING PARTS

This is a continuation of application Ser. No. 942,139 filed Mar. 2, 1987, abandoned, which is a continuation of application Ser. No. 829,345 filed Feb. 13, 1986, abandoned.

BACKGROUND OF THE INVENTION

The invention described herein relates generally to heat pumping and refrigerating engines and more particularly to heat-driven acoustic cooling engines having no moving parts. This invention is the result of a contract with the Department of Energy (Contract No. W-7405-ENG-36).

The present invention is related to a phenomenon studied as early as the 1850's by the European physicist Sondhaus, in which sound is produced by heating one end of a glass or metal tube. This and similar phenomena were discussed as early as 1878 by Lord Rayleigh in his treatise entitled Theory of Sound. In these phenomena heat is used to produce work in the form of sound.

U.S. Pat. No. 4,489,553 to Wheatley et al. discloses an intrinsically irreversible heat engine. The engine is intrinsically irreversible because it uses heat transfer processes which are intrinsically irreversible in the thermodynamic sense, in contrast to a conventional heat engine which approaches optimum efficiency as the heat transfer processes become increasingly reversible. The intrinsically irreversible heat engine comprises a first thermodynamic medium, such as a fluid, and a second thermodynamic medium, such as a set of parallel plates, which are in imperfect thermal contact with each other and which bear a broken thermodynamic symmetry with respect to each other. U.S. Pat. No. 4,489,553 is expressly incorporated by reference herein for all that it teaches.

As a heat pump or refrigerator, the intrinsically irreversible heat engine includes a driver for effecting a reciprocal motion of the fluid at a frequency which is approximately inversely related to the thermal relaxation time of the fluid relative to the plates. This motion, together with the cyclic variation in temperature and pressure of the fluid, results in the pumping of heat along the plates and the concomitant generation of a temperature difference along the length of the plates.

The acoustic heat pumping engine disclosed in U.S. Pat. No. 4,489,553 comprises a housing which can be either a straight, J-shaped or U-shaped tube. One end of the housing is capped and the other end is closed by a diaphragm and voice coil, which serve as an acoustic driver for generating an acoustic wave within the housing. The housing is filled with a compressible fluid, such as a gas, capable of supporting an acoustic standing wave. The plates are located within the housing near the capped end. Different parts of the plates receive heat at different rates from the gas moved therethrough during the time of increasing pressure of a wave cycle, and give up heat at different rates to the gas as the pressure of the gas decreases during the appropriate part of the wave cycle. The imperfect thermal contact between the gas and the plates results in a phase lag different from 90° between the local gas temperature and its local velocity. As a result there is an acoustically stimulated heat pumping action which results in a temperature difference along the length of the plates. The ends of the plates nearest the driver become cold and the ends of the plates farthest from the driver become hot.

The acoustic heat pumping engine disclosed in U.S. Pat. No. 4,489,553 is useful for cooling, but it requires an electromechanical acoustic driver. It is highly desirable to design a refrigeration apparatus capable of attaining temperatures of about 0° C. and having no moving parts. Applicants have built such an apparatus using a heat source as the only energy source. Heat has previously been used to produce refrigeration in the absorption refrigerator and in the Vuilleumier cycle Stirling-type heat pump. However, prior to applicants' present invention, a heat source has not been used to produce refrigeration from an acoustic cooling engine.

SUMMARY OF THE INVENTION

One object of the present invention is to provide a heat-driven cooling engine having no moving parts.

Another object of the invention is to use waste heat as a source of energy to cool a load.

Still another object of the invention is to provide a heat-driven acoustic cooling engine.

To achieve the foregoing and other objects, and in accordance with the purposes of the present invention, as embodied and broadly described herein, there is provided a heat-driven acoustic cooling engine having no moving parts. The acoustic cooling engine receives heat from a high temperature heat source. The acoustic cooling engine comprises an elongated resonant pressure vessel having first and second ends. Preferably the resonant pressure vessel comprises an elongated housing with first and second ends and a reservoir which is in fluid communication with and sealably engages the second end of the housing. A compressible fluid, such as a gas, capable of supporting an acoustic standing wave and having a substantial thermal expansion coefficient is contained in the housing and in the reservoir. A first heat exchanger receives heat from and is in thermal communication with the heat source. The first heat exchanger is located in the housing spaced-apart from the first end of the housing. A first thermodynamic element having first and second ends converts some of the heat transmitted by the first heat exchanger into acoustic power. The first thermodynamic element is located in the housing with its first end adjacent to the first heat exchanger and between the first heat exchanger and the second end of the housing. A second thermodynamic element utilizes the acoustic power to pump heat and provide refrigeration. The second thermodynamic element is located in the housing spaced-apart from the first thermodynamic element and on the opposite side of the first thermodynamic element from the first heat exchanger. The second thermodynamic element has a first end which heats and a second end which cools as a consequence of the acoustic power generated by the first thermodynamic element. The first end of the second thermodynamic element is located closer to the first thermodynamic element than is the second end of the second thermodynamic element. A second heat exchanger is located in the housing and interposed between the first and second thermodynamic elements. The second heat exchanger is adjacent to the second end of the first thermodynamic element and to the first end of the second thermodynamic element. The second heat exchanger receives heat rejected from the first and second thermodynamic elements to the fluid. An ambient heat sink is thermally coupled to the second heat exchanger and receives heat from the second heat exchanger. The heat sink is located outside of the housing. Each of the first and second heat exchangers and the first and second thermodynamic elements permits substantial flow of the compressible fluid therethrough.

In a preferred embodiment of the invention, the acoustic cooling engine further includes a third heat exchanger located in the housing and adjacent to the second end of the second thermodynamic element. The third heat exchanger is cooled by the fluid and permits substantial flow of the fluid through the third heat exchanger. A thermal communication device is thermally coupled to the third heat exchanger to permit cooling of a load which can be located outside of the housing. The thermal communication device is unnecessary when the load is located inside of the housing. The elongated housing is a cylindrical metal tube having a larger diameter portion containing the first, second and third heat exchangers, and the first and second thermodynamic elements, and a smaller diameter portion located between the larger diameter portion and the reservoir. The smaller diameter portion is substantially smaller in diameter than the larger diameter portion. The fluid is gaseous helium contained at a pressure substantially above atmospheric pressure. The first heat exchanger is a first plurality of spaced-apart metal strips extending parallel to each other and to the longitudinal axis of the housing. The first thermodynamic element comprises a first plurality of elongated spaced-apart plates extending parallel to the longitudinal axis of the housing and to each other. A plane parallel to the first plurality of plates is substantially non-parallel to a plane parallel to the first plurality of strips. The second thermodynamic element comprises a second plurality of elongated spaced-apart plates extending parallel to the longitudinal axis of the housing and to each other. The second plurality of plates is substantially parallel to the first plurality of plates. The second heat exchanger comprises second and third pluralities of metal strips, the metal strips in each plurality being parallel to each other and to the longitudinal axis of the housing. The metal strips in each plurality are substantially non-parallel to the first and second pluralities of plates. The third heat exchanger comprises a fourth plurality of spaced-apart metal strips extending parallel to the longitudinal axis of the housing and to each other. The strips of the fourth plurality are substantially parallel to the strips of the second and third pluralities of metal strips.

One advantage of the present invention is that it is simple and reliable.

Another advantage of the invention is that it has no moving parts. The only moving substance is a fluid which moves acoustically and which thereby stimulates thermodynamic heat flows within the acoustic cooling engine.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figure 1:
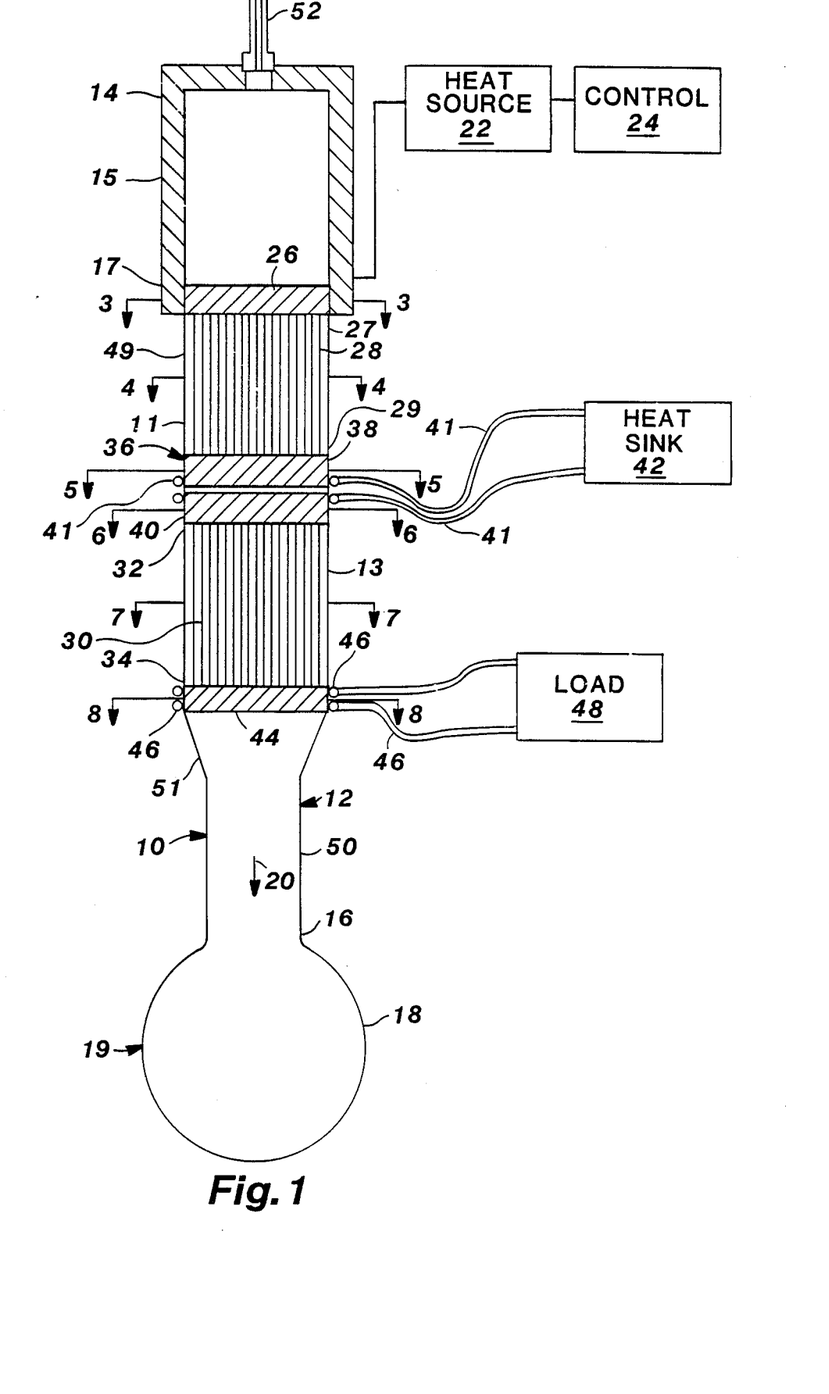
FIG. 1 shows a cross-sectional view of an embodiment of the present invention.

Reference is now made to FIG. 1 which shows a cross-sectional view of a preferred embodiment of the present invention. The present invention is a heat-driven acoustic cooling engine 10 having no moving parts. The acoustic cooling engine 10 receives heat from a high temperature heat source 22. U.S. Pat. No. 4,489,553 discloses the use of heat to produce sound in a prime mover, and also discloses the separate use of sound to produce refrigeration in a heat pump. In the present invention, in a single apparatus, heat is used to produce sound, which in turn is used to produce refrigeration. Acoustic cooling engine 10 includes an elongated resonant pressure vessel 19 which is preferably a housing 12, having a first end 14 and a second end 16, and a reservoir 18 in fluid communication with and sealably engaging second end 16. Housing 12 includes two thin-walled sections 11 and 13 of lower longitudinal thermal conductance than a hollow heavy-walled vessel 15 located at first end 14 of housing 12. Vessel 15 is also part of housing 12. A compressible fluid, represented by arrow 20, is capable of supporting an acoustic standing wave and is contained in housing 12 and in reservoir 18. The fluid has a substantial thermal expansion coefficient and can be a gas such as helium. Housing 12 has a length of less than one-fourth the wavelength of the acoustic standing wave. Heat source 22 is in thermal communication with vessel 15 and is located proximate first end 14 of housing 12. Heat source 22 can be a flame or any source of moderately high temperature heat, including waste heat. Preferably heat source 22 is controlled by a control device 24. A first heat exchanger 26 is in thermal communication with and receives heat from heat source 22. First heat exchanger 26 is located at the bottom 17 of vessel 15.

A first thermodynamic element 28 is located in housing 12 adjacent to first heat exchanger 26 and between first heat exchanger 26 and the second end 16 of housing 12. First thermodynamic element 28 is immediately adjacent to first heat exchanger 26. First thermodynamic element 28 receives heat from the fluid heated at first heat exchanger 26 by heat source 22. First thermodynamic element 28 converts some of the heat into acoustic power. First thermodynamic element 28 has a heat capacity, within at least a thermal penetration depth of the boundary of the fluid and the first thermodynamic element 28, substantially larger than the heat capacity, within at least a thermal penetration depth of the boundary of the fluid and the first thermodynamic element 28, of the fluid and permits substantial flow of the fluid through first thermodynamic element 28. A thermal penetration depth is defined in U.S. Pat. No. 4,489,553 at column fourteen. First thermodynamic element 28 is located in section 11, a region of lower longitudinal thermal conductance than vessel 15. First thermodynamic element 28 has a first end 27 and a second end 29.

A second thermodynamic element 30 uses the acoustic power to produce refrigeration. The second thermodynamic element 30 is located in housing 12 spaced-apart from first thermodynamic element 28. Second thermodynamic element 30 has a first end 32 and a second end 34. Second thermodynamic element 30 has a heat capacity, within at least a thermal penetration depth of the boundary of the fluid and the second thermodynamic element 30, substantially larger than the heat capacity, within at least a thermal penetration depth of the boundary of the fluid and the second thermodynamic element 30, of the fluid. The second end 34 is cooled and the first end 32 is heated by the acoustic action of the acoustic power generated in first thermodynamic element 28. Second thermodynamic element 30 is located in section 13, a region of lower longitudinal thermal conductance than vessel 15.

A second heat exchanger 36 is located in housing 12 between first thermodynamic element 28 and second thermodynamic element 30, immediately adjacent to first end 32 of second thermodynamic element 30 and immediately adjacent to second end 29 of first thermodynamic element 28. Second heat exchanger 36 receives heat rejected from first thermodynamic element 28 and second thermodynamic element 30 to the fluid.

An ambient heat sink 42 is thermally coupled to second heat exchanger 36. In the preferred embodiment shown, heat sink 42 includes a pair of tubes 41 through which cold water flows. The tubes 41 are located outside of housing 12 and touch housing 12 proximate second heat exchanger 36. Heat sink 42 receives heat from second heat exchanger 36. Heat sink 42 could be connected to housing 12 with a heat pipe or other suitable device.

In the preferred embodiment of the acoustic cooling engine 10 shown in FIG. 1, a third heat exchanger 44 is located in housing 12 adjacent to second end 34 of second thermodynamic element 30. Third heat exchanger 44 is cooled by the fluid through thermoacoustic action and permits substantial flow of the fluid therethrough.

Conduits 46 serve as a thermal communication device to thermally couple third heat exchanger 44 as shown, or in the alternative to thermally couple second end 34 of second thermodynamic element 30, to a load 48 located outside of and away from housing 12. Conduits 46 can be heat pipes or other suitable devices. Load 48 is cooled by conduits 46, giving up heat to acoustic cooling engine 10. The load 48 could also be cooled by inserting the reservoir 18 and all portions of acoustic cooling engine 10 between reservoir 18 and third heat exchanger 44, into the load 48 itself. The load 48, if small, could be located in housing 12 near third heat exchanger 44 and be cooled directly by the fluid.

Heat is added to acoustic cooling engine 10 both by heat source 22 at first end 14 of housing 12 and by load 48, which is cooled. Heat is removed from acoustic cooling engine 10 near its middle by means of second heat exchanger 36 and heat sink 42. The efficiency of acoustic cooling engine 10 is maximized and the temperature difference needed to produce acoustic power is minimized by minimizing the rate of energy loss in resonant pressure vessel 19. These results are achieved by our preferred embodiment of resonant pressure vessel 19 which includes reservoir 18 having a volume of about two liters and housing 12 having a larger diameter portion 49 with an inside diameter of 38.1 mm and a smaller diameter portion 50 with an inside diameter of 25.4 mm. Larger portion 49 includes vessel 15 and thin-walled sections 11 and 13. First heat exchanger 26, first thermodynamic element 28, second thermodynamic element 30, second heat exchanger 36, and third heat exchanger 44 are all located in, and have a slightly smaller diameter than, larger portion 49. Smaller portion 50 is located between reservoir 18 and larger portion 49. At the junction 51 between larger portion 49 and smaller portion 50, there is a reduction in the diameter of housing 12, with a slope of about 45°. This reduction in diameter resulted in an unexpected improvement in the performance of the acoustic cooling engine 10. Housing 12 has a length of less than one-fourth the wavelength of the acoustic standing wave. Reservoir 18 is preferably a hollow sphere made of electro-formed nickel on copper. A thermocouple (not shown) can be inserted into acoustic cooling engine 10 through port 52.

Figure 2:
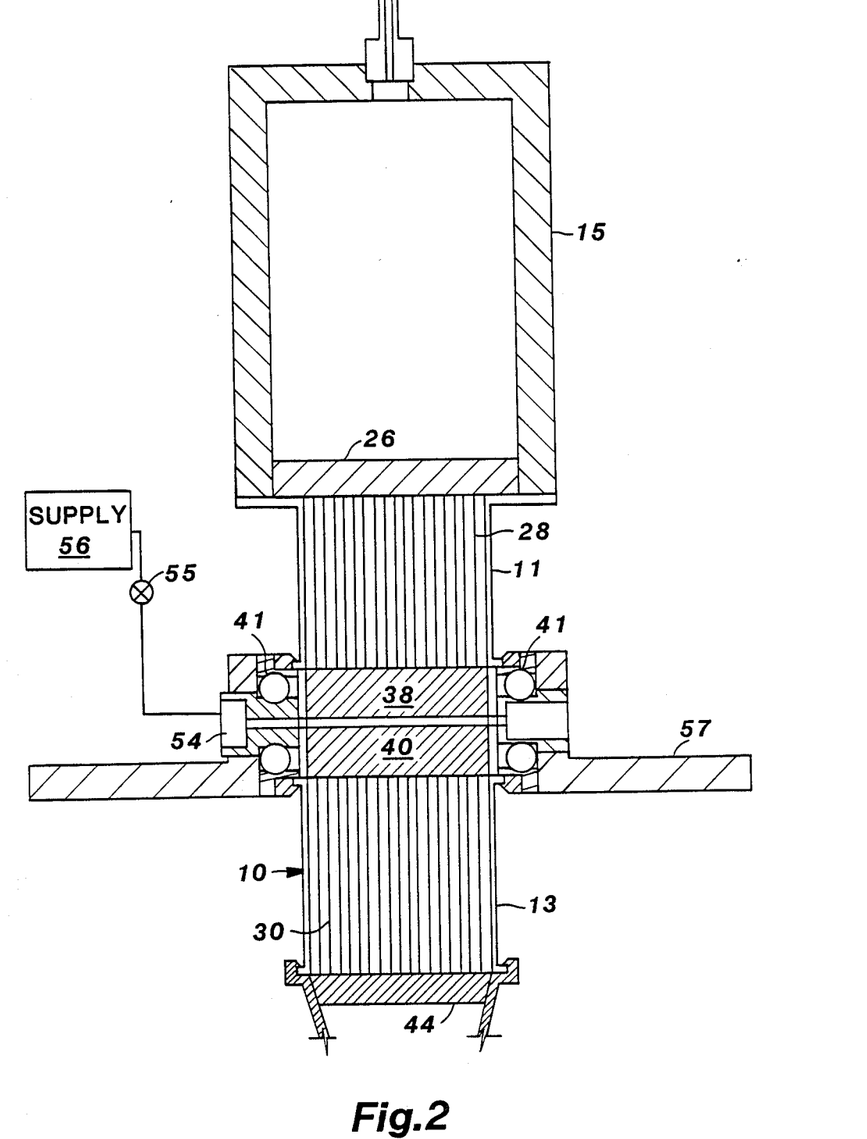
FIG. 2 shows a cross-sectional enlarged view of portions of the embodiment shown in FIG. 1.

Reference is now made to FIG. 2 which shows a cross-sectional enlarged view of portions of the embodiment of the acoustic cooling engine 10 shown in FIG. 1. The fluid, which is preferably helium gas, can be introduced from a supply 56 into acoustic cooling engine 10 through a low fluid volume valve 55 and a port 54. The gas is maintained in housing 12 under a pressure of 3 to 4 bar, for the preferred dimensions of the acoustic cooling engine 10. A vacuum vessel (not shown) can be attached to a flange 57, to provide insulation.

Figure 3:
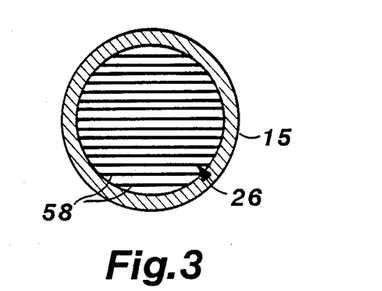
FIG. 3 shows a cross-sectional view of the embodiment of FIG. 1, taken along section line 3—3.

Reference is now made to FIG. 3 which shows a cross-sectional view of the first heat exchanger 26 of the acoustic cooling engine 10 shown in FIG. 1, taken along section line 3—3. Preferably first heat exchanger 26 comprises a first plurality of spaced-apart metal strips 58 extending parallel to each other and to the longitudinal axis of housing 12. Each of the first strips 58 is 0.05 cm thick, spaced-apart by 0.10 cm, 0.76 cm long and is electron-beam welded into the bottom 17 of vessel 15. First strips 58 and vessel 15 are made of nickel.

Figure 4:
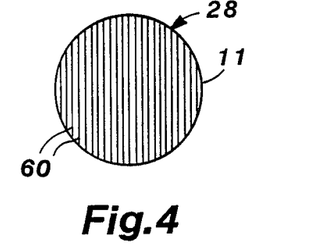
FIG. 4 shows a cross-sectional view of the embodiment of FIG. 1, taken along section line 4—4.

Reference is now made to FIG. 4 which shows a cross-sectional view of the first thermodynamic element 28 of the acoustic cooling engine 10 shown in FIG. 1, taken along section line 4—4. First thermodynamic element 28 preferably comprises a first plurality of elongated spaced-apart plates 60 extending parallel to the longitudinal axis of housing 12 and to each other. A plane parallel to the first plates 60 is substantially non-parallel to a plane parallel to the first strips 58 and preferably perpendicular thereto. This non-parallel arrangement facilitates a uniform distribution of fluid flow through housing 12. The first plates 60 of first thermodynamic element 28 are 0.025 cm thick and spaced-apart from each other by 0.08 cm. First plates 60 are 3.43 cm long and are made of stainless steel, as is thin-walled section 11, which is 0.05 cm thick.

Figure 5:
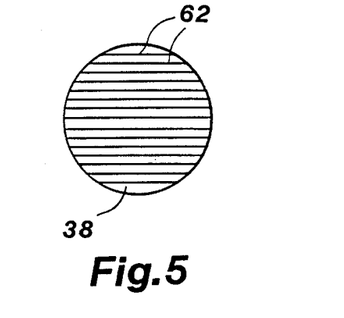
FIG. 5 shows a cross-sectional view of the embodiment of FIG. 1, taken along section line 5—5.
Figure 6:
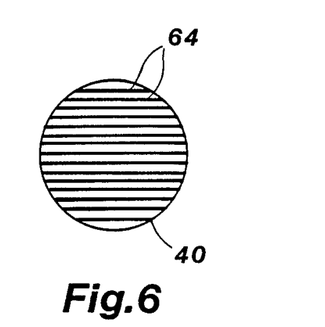
FIG. 6, shows a cross-sectional view of the embodiment of FIG. 1, taken along section line 6—6.

Reference is now made to FIGS. 5 and 6 which show cross-sectional views of the second heat exchanger 36 of the acoustic cooling engine 10 shown in FIG. 1, taken along section lines 5—5 and 6—6. Preferably second heat exchanger 36 includes a first component 38 and a second component 40. First component 38 is a second plurality of spaced-apart metal strips 62 and second component 40 is a third plurality of spaced-apart metal strips 64. The second metal strips 62 and the third metal strips 64 are parallel to each other and to the longitudinal axis of housing 12. Second strips 62 and third strips 64 are substantially non-parallel to first plates 60. Second strips 62 of second heat exchanger 36 receive heat rejected by the fluid from first thermodynamic element 28 and permit substantial flow of the fluid therethrough. Third strips 64 receive heat rejected by the fluid from first end 32 of second thermodynamic element 30, shown in FIG. 1, as a consequence of acoustic heat pumping. Third strips 64 permit substantial flow of the fluid therethrough. Second and third strips 62, 64 are made of copper and are 0.05 cm thick and 1 cm long. Second strips 62 are spaced-apart from each other by 0.10 cm, as are third strips 64. First component 38 and second component 40 are spaced longitudinally from each other by 0.15 cm to decouple the heat rejection actions of the first thermodynamic element 28 and second thermodynamic element 30.

Figure 7:
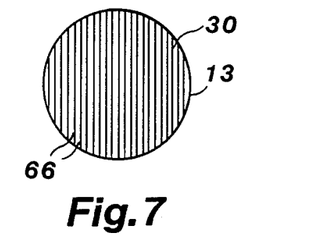
FIG. 7 shows a cross-sectional view of the embodiment of FIG. 1, taken along section line 7—7.

Reference is now made to FIG. 7 which shows a cross-sectional view of second thermodynamic element 30 of acoustic cooling engine 10, shown in FIG. 1, taken along section line 7—7. Second thermodynamic element 30 preferably comprises a second plurality of elongated spaced-apart plates 66 extending parallel to each other and to the longitudinal axis of housing 12. The second plates 66 are substantially parallel to the first plates 60. Second plates 66 are 0.025 cm thick and spaced-apart by 0.08 cm. Second plates 66 have a length which depends on the desired cooling properties. In the preferred embodiment, second thermodynamic element 30 is 4.00 cm long. Second plates 66 are made of stainless steel, but could be made of other materials such as fiberglass. Thin-walled section 13 is 0.05 cm thick stainless steel though it can be made of fiberglass also, and is of lower longitudinal thermal conductance than vessel 15.

Figure 8:
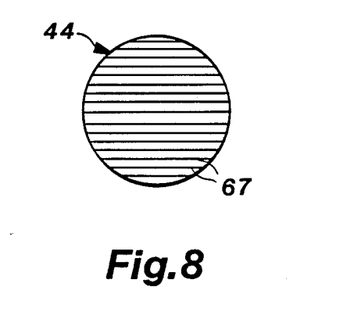
FIG. 8 shows a cross-sectional view of the embodiment of FIG. 1, taken along section line 8—8.

Reference is now made to FIG. 8 which shows a cross-sectional view of third heat exchanger 44 of acoustic cooling engine 10 shown in FIG. 1, taken along section line 8—8. Third heat exchanger 44 preferably is a fourth plurality of spaced-apart metal strips 67 extending parallel to each other and to the longitudinal axis of housing 12. Fourth strips 67 are made of copper and have similar dimensions to second and third strips 62, 64. Fourth strips 67 are substantially non-parallel to second plates 66. Third heat exchanger 44 can also be a copper mesh screen.

Referring again to FIG. 1, in operation of the acoustic cooling engine 10, heat from heat source 22 produces sound which produces refrigeration. The net result is a device, with no moving parts, which uses heat as an input at one end to produce cold at the other end and rejects heat in the middle. The temperature gradient in first thermodynamic element 28 is so large that when the gas moves longitudinally toward first end 14 of housing 12, warming adiabatically, it is still cooler than the adjacent first plates 60. Consequently, heat flows from first plates 60 to the gas, but because of the irreversible process of thermal conduction, the heat flow is delayed. Naturally, the gas expands as it is heated. This expansion along with the thermal time lag results in a component of the longitudinal gas velocity flow which is in time phase with the increased dynamic pressure. Similarly, on the next half-cycle of the acoustic motion when the gas moves longitudinally away from first end 14 and cools adiabatically, the gas will still be hotter than adjacent first plates 60, so heat will flow from the gas to first plates 60, thereby causing the helium to contract, but again with a time delay. This leads to a component of the longitudinal gas flow velocity which is now in time phase with the decreased dynamic pressure. As a result, work is produced by the fluid on both half cycles of the acoustic motion and work will flow out of first thermodynamic element 28. Heat flows into the first end 27 of first thermodynamic element 28 where the thermodynamic symmetry is broken by the thermal effect of first heat exchanger 26, and heat flows out of the second end 29 of first thermodynamic element 28 where the thermodynamic symmetry is broken by the thermal effect of second strips 62, shown in FIG. 5. Work flows out of first thermodynamic element 28 and down housing 12.

Figure 11:
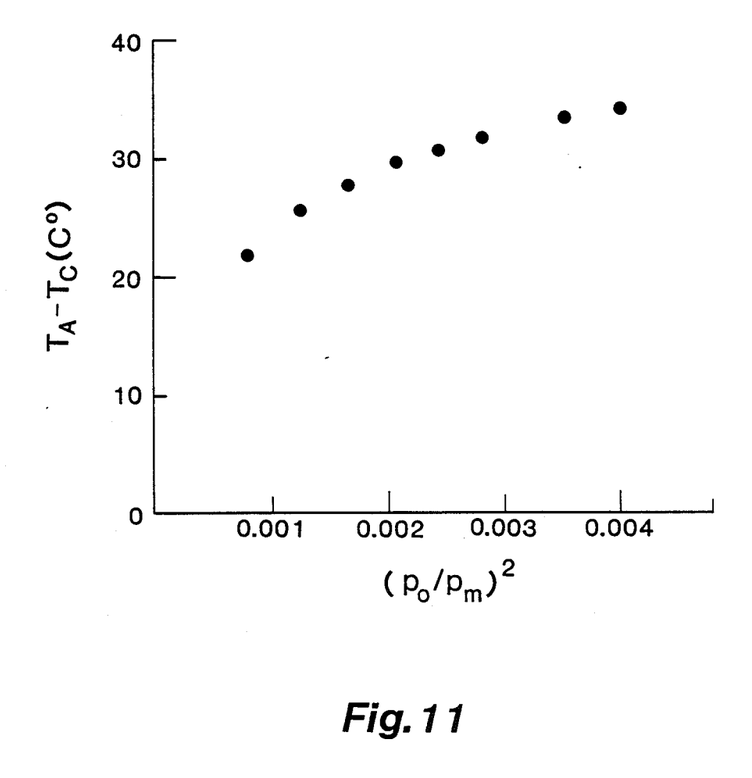
FIG. 11 graphically illustrates the temperature difference between ambient temperature $T_A$ and cold temperature $T_C$ as a function of the square of the ratio of the amplitude $p_o$ of the dynamic pressure generated by the acoustic cooling engine to the mean pressure $p_m$.

The reverse effect occurs in the second thermodynamic element 30. The acoustic power can be coupled to a second thermodynamic element to operate relatively either as a heat pump or a refrigerator. For example, U.S. Pat. No. 4,489,553, at FIG. 11, teaches the use of acoustic energy to pump heat from a relatively cool temperature (heat source 74) to a relatively high temperature (heat sink 70). As shown in FIG. 11, initially there is no temperature gradient in second plates 66, so as the gas moves upward toward first end 14, warming, it will transfer heat to second plates 66, with a time delay, contracting. Similarly, as the gas moves downward and away from first end 14, cooling adiabatically, it is colder than and extracts heat from second plates 66, the gas expanding. Heat is rejected at the first end 32 of second thermodynamic element 30 to the gas where the thermodynamic symmetry is broken by third strips 64, shown in FIG. 6. Heat is absorbed from the gas at second end 34 of second thermodynamic element 30 where the thermodynamic symmetry is broken by third heat exchanger 44. These actions cause third heat exchanger 44 to cool relative to third strips 64.

If, for a given temperature gradient imposed on first thermodynamic element 28, the work flow out of first thermodynamic element 28, corresponding to some pressure fluctuation in the gas, is less than that needed to overcome the losses and to drive the heat pumping action in second thermodynamic element 30, the pressure fluctuation will die out. However, if the imposed temperature gradient is large enough, a gas pressure fluctuation will be amplified and grow. The gas will oscillate spontaneously with an amplitude depending on the rate of heat supply, the rate at which heat is pumped, the cooling temperature achieved, and other non-linear phenomena in the system.

Figure 9:
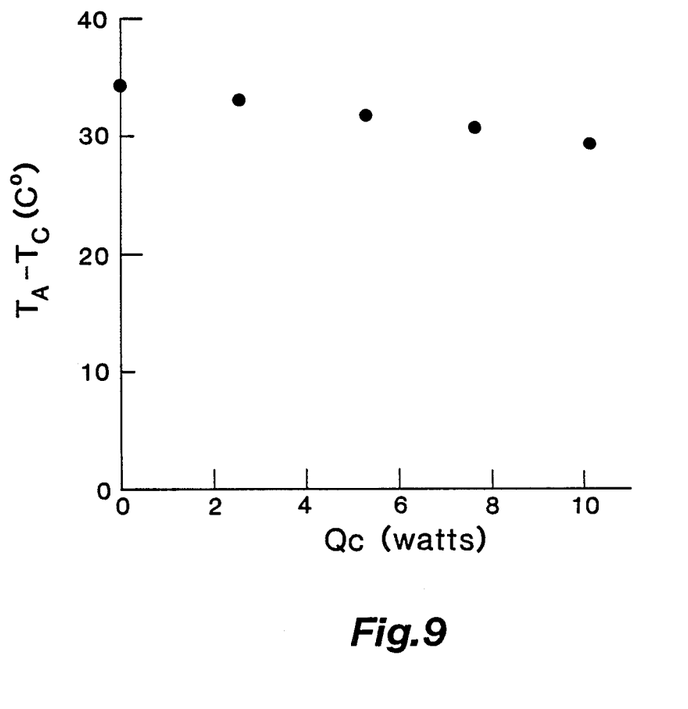
FIG. 9 graphically illustrates the temperature difference between ambient temperature $T_A$ and cold temperature $T_C$ at a constant heating rate of the first heat exchanger, achieved by an embodiment of the invention versus external refrigeration available.

Reference is now made to FIG. 9 which graphically illustrates the temperature difference achieved by an embodiment of the acoustic cooling engine 10 versus the power of a load 48, which for measurement purposes was an electric heater directly attached to housing 12 proximate third heat exchanger 44. Otherwise, the acoustic cooling engine 10 used was the preferred embodiment of the invention. The vertical axis shows, in Celsius degrees, the difference between the temperature of tubes 41, which we call $T_A$ for ambient temperature, and the temperature of second end 34 of second thermodynamic element 30, which we call $T_C$ for cold temperature. The ambient temperature was 24° C., $^4$He was maintained at a mean pressure ($p_m$) of 3.06 bar, the heat source 22 was a constant 350 watts and the frequency was 580–590 Hz. The peak dynamic pressure amplitude, $p_o$, was between 0.181 and 0.194 bar. FIG. 9 shows that as the power of the load 48 to be cooled increased, the temperature difference achieved decreased.

Figure 10:
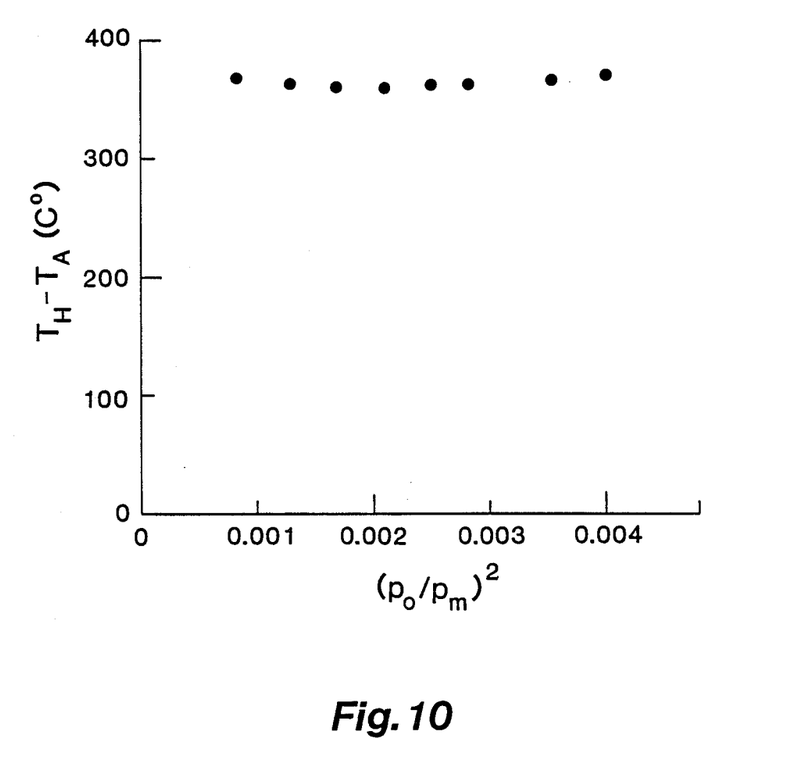
FIG. 10 graphically illustrates the temperature difference between the high temperature heat source and the ambient heat sink as a function of the square of the ratio of the amplitude $p_o$ of the dynamic pressure generated by the acoustic cooling engine to the mean pressure $p_m$.

Reference is now made to FIG. 10, which graphically illustrates the temperature difference between $T_H$, the heat source 22 temperature, measured at first heat exchanger 26 by a thermocouple introduced through port 52, and the ambient temperature $T_A$ measured at tubes 41, as a function of the square of the ratio $p_o/p_m$. $T_A$ was 23° C., $^4$He was maintained at a mean pressure $p_m$ of 3.06 bar, there was no load 48 and the frequency varied from 581 to 589 Hz. The temperature of heat source 22 need not be increased substantially to obtain more power.

Reference is now made to FIG. 11 which graphically illustrates the temperature difference achieved across the second thermodynamic element 30 by the preferred embodiment of the invention. There was no load 48 and the conditions were the same as for the data shown in FIG. 10. As engine 10 is driven harder, the temperature difference achieved increases.

The foregoing description of an embodiment of the invention has been presented for purposes of illustration and description. It is not intended to be exhaustive or to limit the invention to the precise form disclosed. It was chosen and described in order to best explain the principles of the invention and its practical application and thereby to enable others skilled in the art to best utilize the invention in various embodiments and with various modifications as are suited to the particular use contemplated. It is intended that the scope of the invention be defined by the claims appended hereto.

What is claimed is:

1. An acoustic cooling engine driven by a heat source comprising:
   container means for containing a compressible fluid which is capable of supporting an acoustic standing wave, said container means having a first end and a second end;
   first means for receiving heat from the heat source, said first means being located in said container means and effective to transfer heat to said fluid;
   a first thermodynamic element located in said container means adjacent said first means for receiving heat from the compressible fluid and for converting some of the received heat into acoustic power in the form of said acoustic standing wave;
   a second thermodynamic element located in said container means and spaced apart from said first thermodynamic element, said second thermodynamic element having a first portion and a second portion functionally related to said first thermodynamic element to cool said second portion by the acoustic wave generated by said first thermodynamic element; and
   second means located between said first and said second thermodynamic elements for receiving heat rejected from said first and said second thermodynamic elements to said fluid.

2. An acoustic cooling engine driven by a heat source comprising:
   container means for containing a compressible fluid which is capable of supporting an acoustic standing wave having a selected wavelength, said container means having a first end and a second end;
   first means for receiving heat from the heat source, said first means being located in said container means spaced apart from said first end and effective to transfer heat to said fluid;
   a first thermodynamic element located in said container means adjacent said first means and between said first means and said second end of the container means for receiving heat from the compressible fluid and for converting some of the received heat into acoustic power in the form of said acoustic standing wave;
   a second thermodynamic element located in said container means and spaced apart from said first thermodynamic element, said second thermodynamic element having a first end and a second end functionally related to said first thermodynamic element to cool said second end of said second thermodynamic element by the acoustic wave generated by said first thermodynamic element; and
   second means located between said first and said second thermodynamic elements for receiving heat rejected from said first and said second thermodynamic elements to said fluid.

3. The acoustic cooling engine of claim 2 further comprising:
   heat exchanger means being located in said container means adjacent to said second end of said second thermodynamic element.

4. The acoustic cooling engine of claim 2 wherein said container means is an elongated housing having two ends defining a length less than one-fourth of said wavelength of said acoustic standing wave and a reservoir sealably engaged to said second end of said housing, said first means, said second means, said first thermodynamic element, and said second thermodynamic element being located in said elongated housing.

5. The acoustic cooling engine of claim 4 wherein said elongated housing is comprised of two thin-walled sections and a hollow heavy-walled vessel, said thin-walled sections having a lower longitudinal thermal conductance than said heavy-walled vessel.

6. the acoustic cooling engine of claim 5 wherein said first means is located at one end of said heavy walled vessel.

7. The acoustic cooling engine of claim 4 wherein said first means comprises a plurality of spaced-apart strips extending parallel to each other and to the longitudinal axis of said housing.

8. The acoustic cooling engine of claim 4 wherein said elongated housing is a cylindrical tube having a larger diameter portion and a smaller diameter portion, said first means, said second means, said first thermodynamic element, and said second thermodynamic element being located in said larger diameter portion.

9. The acoustic cooling engine of claim 8 wherein said cylindrical tube has a length less than one-fourth said wavelength of said acoustic standing wave.

10. The acoustic cooling engine of claim 4 wherein said first thermodynamic element comprises a plurality of elongated spaced-apart plates extending parallel to each other and to the longitudinal axis of said housing.

11. The acoustic cooling engine of claim 4 wherein said second means comprises a first plurality of spaced-apart strips and a second plurality of spaced-apart strips, said first and said second plurality of strips being longitudinally spaced apart from and parallel to each other and parallel to the longitudinal axis of said housing.

12. The acoustic cooling engine of claim 4 wherein said second thermodynamic element comprises a plurality of elongated spaced-apart plates extending parallel to each other and to the longitudinal axis of said housing.

13. The acoustic cooling engine of claim 4 wherein said first means comprises a first plurality of spaced-apart strips extending parallel to each other and to the longitudinal axis of said housing.

14. The acoustic cooling engine of claim 13 wherein said first thermodynamic element comprises a first plurality of elongated spaced-apart plates extending parallel to each other and to the longitudinal axis of said housing, a plane parallel to said first plurality of elongated spaced-apart plates being nonparallel to a plane parallel to said first plurality of spaced-apart strips.

15. The acoustic cooling engine of claim 14 wherein said nonparallel planes are perpendicular.

16. The acoustic cooling engine of claim 14 wherein said second means comprises a second plurality of spaced-apart strips and a third plurality of spaced-apart strips, said second and said third plurality of strips being longitudinally spaced apart from and parallel to each other and parallel to the longitudinal axis of said housing, a plane parallel to said second and said third plurality of strips being nonparallel to said plane parallel to said first plurality of spaced-apart plates.

17. The acoustic cooling engine of claim 16 wherein said nonparallel planes are perpendicular.

18. The acoustic cooling engine of claim 16 wherein said second thermodynamic element comprises a second plurality of elongated spaced-apart plates extending parallel to each other and to the longitudinal axis of said housing, a plane parallel to said second plurality of elongated spaced-apart plates being nonparallel to said plane parallel to said second and third plurality of spaced-apart strips.

19. The acoustic cooling engine of claim 18 wherein said nonparallel planes are perpendicular.

20. The acoustic cooling engine of claim 18 wherein said elongated housing is a cylindrical tube having a larger diameter portion and a smaller diameter portion, said first means, said second means, said first thermodynamic element, and said second thermodynamic element being located in said larger diameter portion.

21. An acoustic cooling engine driven by a heat source comprising:

container means for containing a compressible fluid which is capable of supporting an acoustic standing wave, said container means having a first end and a second end;

a first plurality of spaced-apart strips extending parallel to each other and located in said container means said first plurality of spaced-apart strips receiving heat from said heat source and being effective to transfer heat to said fluid;

a first plurality of elongated spaced-apart plates extending parallel to each other and located in said container means adjacent said first plurality of strips, a plane parallel to said first plurality of elongated spaced-apart plates being nonparallel to a plane parallel to said first plurality of spaced-apart strips; a second plurality of elongated spaced-apart plates extending parallel to each other and located in said container means spaced apart from said first plurality of elongated spaced-apart plates, a plane parallel to said second plurality of elongated spaced-apart plates being parallel to said plane parallel to said first plurality of elongated spaced-apart plates; and a second plurality of spaced-apart strips and a third plurality of spaced-apart strips, said second and said third plurality of strips being longitudinally spaced apart from and parallel to each other and located in said container means between said first plurality of and said second plurality of spaced-apart elongated plates, a plane parallel to said second and said third plurality of strips being nonparallel to said plane parallel to said first plurality of spaced-apart plates.

22. An acoustic heat transfer engine driven by a heat source, comprising:

container means for containing a compressible fluid which is capable of supporting an acoustic standing wave, said container defining a first end and a second end;

means for establishing a first temperature gradient in said first end;

a first thermodynamic element responsive to said first temperature gradient for generating an acoustic standing wave in said first and second ends of said container;

a second thermodynamic element spaced apart from said first thermodynamic element and responsive to said acoustic standing wave in said second end of said container to establish a second temperature gradient effective to create a temperature difference across said second thermodynamic element.

23. An acoustic heat transfer engine according to claim 22, wherein said first and second ends of said container define a length less than one-fourth of the wavelength of said acoustic standing wave.

24. An acoustic heat transfer engine according to claim 22, wherein said container means includes a relatively small diameter portion and a relative large diameter portion coaxial with said small diameter portion, said relatively large diameter portion containing said first and second ends.

* * * * *